Dec. 12, 1967    J. DUVEAU    3,357,314
STEAM ENGINES
Filed Dec. 13, 1965    2 Sheets-Sheet 1
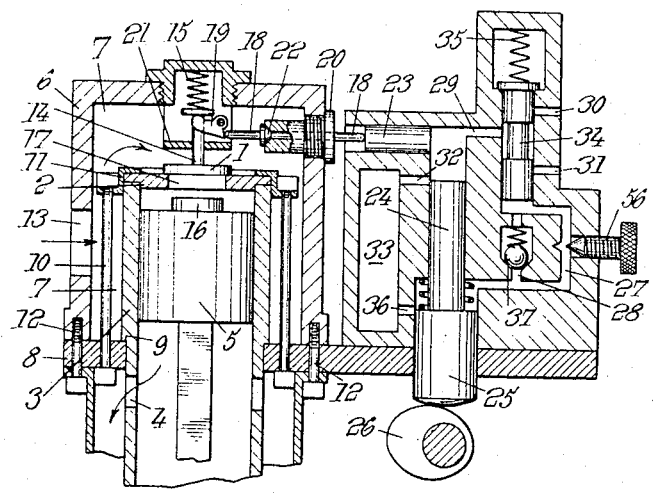
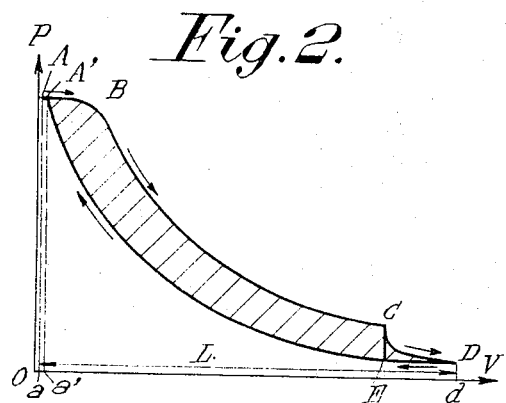
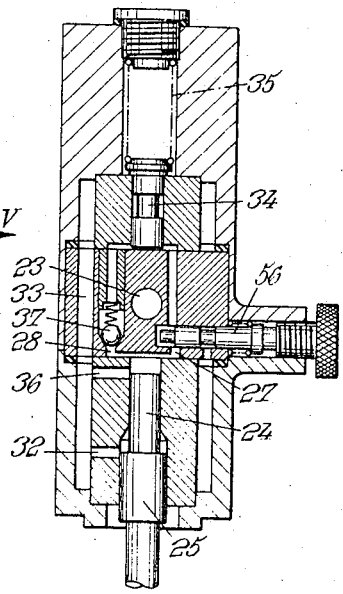
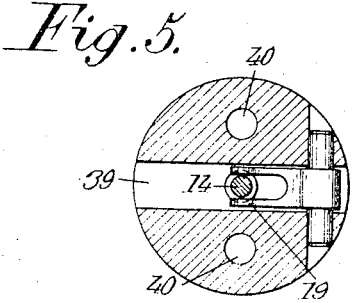
INVENTOR
Jacques Duveau
BY
ATTORNEYS

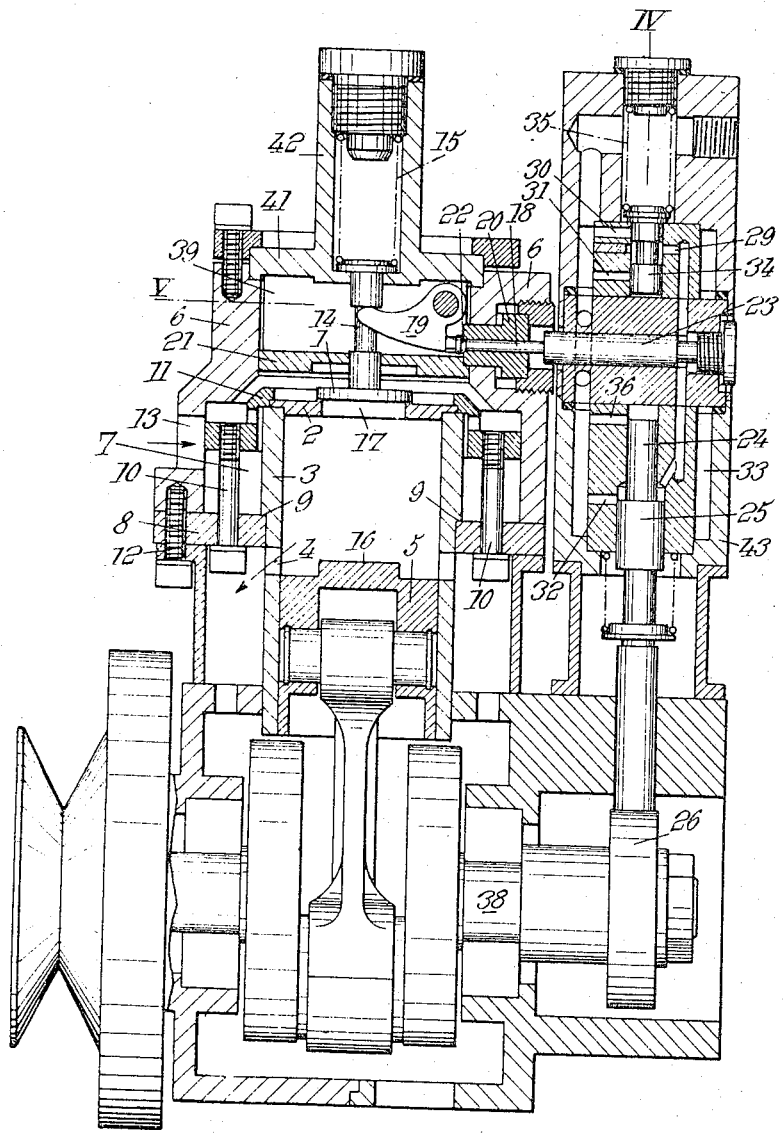

3,357,314
STEAM ENGINES
Jacques Duveau, 23 Ave. Granger, 91, Draveil, France
Filed Dec. 13, 1965, Ser. No. 513,365
Claims priority, application France, Dec. 18, 1964,
999,196
5 Claims. (Cl. 91—263)

ABSTRACT OF THE DISCLOSURE

In a steam engine, there is provided a steam jacket fixed to a base plate secured to the engine cylinder. The steam inlet valve is mounted on the cylinder head and opens toward the outside of the cylinder into the chamber of the steam jacket. The clearance space is very small so that the pressure in the engine cylinder is at the end of the compression stroke of the piston reaches the admission pressure and subsequently no considerable effort is required to actuate the inlet valve. Control of the latter is effected by a hydraulic device self regulated as a function of the rate of working of the engine.

---

The present invention relates to steam engines of the piston type, for all uses, and in particular to small engines having one or several cylinders.

The chief object of the present invention is to improve the efficiency of such engines, in particular by reducing dead spaces, pressure losses, leaks and the wall effects, while maintaining relatively moderate temperatures to permit lubrication, in order to make such engines simpler of manufacture, less subject to deformation under the effect of thermal stresses, of smaller volume, and to ensure their regulation through easily adaptable known means.

In these engines, and more especially in those where relatively high pressures, ranging from 20 to 100 kg./cm.$^2$, are brought into play and in particular in the case of two stroke engines there is provided a steam jacket, surrounding the cylinder and receiving steam before it is admitted into the cylinder, and, according to the present invention, said envelope is secured to the base of the cylinder through means permitting free expansion of the cylinder with respect to the jacket.

A second feature of the present invention relates to the means for controlling the opening of a valve, in particular of a cylinder valve opening toward the outside of the cylinder into a chamber filled with intake steam, the engine cycle being in particular such that the reduced waste space, for the upper dead center position of the piston at the end of the compression stroke, gives rise to a pressure close to the intake pressure or higher than it, in such manner as to facilitate the valve opening. This second feature consists in making said means in the form of a transmission rod acting upon said valve, the passage of said rod being fluidtight, whereas the valve stem and the annexed part cooperating therewith (springs, etc.) work in a space under steam pressure.

A third feature of the present invention consists, in engines of the type in question and especially complying with the above specified conditions, in controlling the intake valve through a hydraulic control self regulated as a function in particular of the number of revolutions per minute of the engine, this control being of the kind of those used in the pumps of fuel injection engines.

Preferred embodiments of the present invention will be hereinafter described with reference to the appended drawings, given merely by way of example, and in which:

FIG. 1 is a diagrammatic sectional view of a single cylinder steam engine made according to the present invention;

FIG. 2 illustrates the diagram of operation of such an engine;

FIG. 3 is a sectional view analogous to FIG. 1, but more detailed;

FIG. 4 is a sectional view on the line IV—IV of FIG. 3, and

FIG. 5 is a sectional view on the line V—V of FIG. 3.

It will be supposed that the following description relates to the case of a single cylinder high pressure engine, the pressures ranging for instance from 25 to 100 kg./cm.$^2$.

This engine is preferably, as shown, of the type including an intake valve 1 (FIG. 1) in the cylinder head 2 of cylinder 3, and exhaust ports 4 in said cylinder, said ports being cleared by piston 5 at the end of its stroke. The engine is for instance of the two stroke and single effect type as shown by FIG. 2, that is to say with an intake and expansion stroke and a stroke corresponding to compression of the residual steam. Cylinder 3 is surrounded by a steam jacket 6 through which flows the steam admitted to said intake valve.

Such an arrangement, in the above mentioned case of an engine working with a high intake pressure, permits of ensuring ideal lubrication conditions, and of avoiding the wall effects despite the water condensation that tends to take place at the end of expansion.

As a matter of fact it is known that, for pressures of 50 kg. per sq. cm. for instance, the boiling temperature is 267° C. If a high overheating, for instance of the order of magnitude of 550° C., is provided, condensation at the end of expansion might be avoided. But such overheating temperatures make, in the case of piston engines, lubrication extremely difficult. It is therefore necessary to have only moderate overheatings, for instance up to temperatures of the order of magnitude of 300–350° C. Now, for such temperatures, at the end of the compression strokes, condensation occurs and fine droplets deposit upon the walls and produce what is called a wall effect, a well known phenomenon highly detrimental of efficiency. The use of a steam chamber 7 around cylinder 3, by heating the walls of said cylinder, therefore permits of keeping said walls dry and of attenuating the wall effect phenomenon, which improves the efficiency, while maintaining an excellent lubrication at the moderate temperatures that are adopted.

Concerning the manner in which the steam jacket is arranged, it is advantageous, according to the present invention, to make use of an arrangement such that said jacket 6 is fixed to the base of the cylinder through means permitting free expansion of the cylinder with respect to the jacket.

As a matter of fact, it is known that, in existing arrangements, important temperature differences act in a nonuniform manner upon said walls, produce dangerous expansions which may be avoided by the use of the above mentioned means.

As diagrammatically illustrated by FIG. 1, said means comprise a base plate 8 adapted to bear upon a shoulder 9 of the cylinder, under the action of bolts 10 connecting this plate with a flange 11, which serves to the fixation of cylinder head 2 to cylinder 3. To this base plate 8 will be fixed, through bolts 12, steam jacket 6 into which steam is admitted through port 13.

Such a system can easily be taken to pieces and permits free expansions of its elements.

Valve 1 is provided at the top of the cylinder head and it opens into steam chamber 7.

In order to ensure the operation of the system, use is made of the arrangement which will now be described and which permits of avoiding the necessity of any special fluidtight means for the guiding of the stem 14 of said valve, whereby it can be mounted free in said chamber, together with its spring 15.

According to this feature, the cycle of the engine is established in such manner that the upper waste space, at the end of the compression stroke, produces a pressure equal to or higher than the intake pressure, in such manner as to facilitate the opening of the valve.

Considering for instance the cycle ABCDEA' where portion A'AB corresponds to admission (from the opening of the intake valve to its closing), portion BC to expansion (until the opening of exhaust ports 4), portions CDE to exhaust, and portion EA' to compression, it will be seen that, according to said feature, the admission pressure is reached at A' for a position $a'$ of the piston slightly before the upper dead center position $a$ which corresponds for instance to a waste space equal to 1% of the cylinder volume L. Said position $a'$ would correspond for instance to 3% of the cylinder capacity.

In order to obtain such low values of the waste space, the piston is for instance provided with a projection 16 adapted to penetrate, at the end of the upward stroke, into a port 17 provided in cylinder head 2 opposite valve 1.

In order to control said valve, use is made of means the construction of which will be simplified by the fact that no stress is to be provided for the valve opening, with the exception, of course, of inertia forces and of the action of return spring 15.

Said means include a transmission rod 18 (itself operated in accordance with the cycle to be obtained, for instance as it will be hereinafter stated) acting upon a transmission lever 19 against the action of spring 15, said rod passing with a fluidtight fit through the wall of jacket 6, in a device 20 provided for this purpose.

It should be noted that the valve stem proper 14 need not pass in a fluidtight manner through its guide 21 (since it moves inside the space under pressure 7 limited by jacket 6) and that a fluidtight packing is to be provided only on rod 18, which is made easy by the fact that said rod, having little effort to be supported, can be made of small cross section.

Advantageously it may be completed by a check valve 22 which ensures total fluidtightness for the whole time of closing, that is to say during most of the cycle (opening corresponding only to AB).

In order to actuate said transmission rod, use may be made of any valve control device of a known type, provided with means for adjusting the time of opening.

It will be noted that the arrangement of the rod of check valve 22, ensuring perfect fluidtightness without requiring packing means for the guides of valve 21 might be applied to any mechanism within the scope of the invention.

Advantageously, according to another feature of the invention, the valve is controlled through a self regulating hydraulic system of the kind of those used in fuel injection pumps for internal compression engines.

A system of this kind is diagrammatically shown in FIG. 1.

The above mentioned rod 18 is driven by a piston 23 itself hydraulically controlled by a differential piston 24, 25 actuated by a cam 26 from the engine crankshaft. The portion 25 of said piston cooperates, through conduits 27 and 28, with a slide valve or shuttle 34 subjected to the action of a return spring 35 and the opposed edges of which cooperate with ports 29, 30, 31.

The opening of valve 1 by rod 18 and piston 23 takes place when piston 24 comes to close a feed port 32 in communication with a reserve of liquid 33. Opening therefore takes place at a fixed point of the cycle, for instance slightly before the engine passes through its upper dead center position.

During the upward movement of pistons 24 and 25, under the effect of cam 26 piston 25 closes passage 36 and then delivers liquid a little through passage 27 but chiefly through passage 28 (since check valve 37 opens practically without resistance).

Shuttle 34 is pushed upwardly. For a time, its ends close ports 31 and 30 so that the liquid discharged by piston 24 pushes toward the left piston 23 and rod 18. After a time, the groove of shuttle 34 places port 29 into communication with discharge port 30 so that liquid escapes through said port 30 and piston 23 ceases to be pushed toward the left.

Valve 1 then closes and piston 5 moves down.

Simultaneously, the whole of pistons 24 and 25 moves back in the downward direction under the effect of the return spring acting upon the top face of piston 25.

As check valve 37 then closes, the liquid pushed back by shuttle 34 under the action of its spring 35 can return to the space above piston 25 only through conduit 27 throttled at 56.

At speeds of the engine above a given value the braking action of this throttled passage is such that shuttle 34 has not yet come back to the position where it clears discharge port 31 when, on the next stroke, piston 25 again starts delivering liquid through conduit 28. As a matter of fact, the lowest point reached by shuttle 34 depends upon the speed of the engine and it is the higher as said speed is itself higher. Since the amount of liquid delivered by piston 25 past check valve 37 is always the same but begins to act on shuttle 34 for a position of said shuttle higher and higher as the speed of the engine increases, the clearing of port 30 takes place earlier and earlier in the cycle of operation of the engine as the speed of said engine increases.

Such a device permits of regulating the position of closing of valve 1 (that is to say the position of point B in the diagram of FIG. 2), this regulation being effected through screw 56.

Of course, other regulating means might be used. Of course also, adjustment of the opening and closing stroke AB might be performed in any other way, in particular through mechanical means, either automatic or controlled by the operator.

FIGS. 3 to 5 illustrate an engine made according to FIG. 1, but shown with constructional details, the same parts being designated by the same reference numerals. 38 is the crankshaft on which eccentric 26 is mounted. The block 21 serving to the guiding of the stem 14 of valve 1 is illustrated in FIG. 5. It is a cylindrical block with a slot 39 for the passage of the transmission of the valve control means 19 and which is made rigid at 40, by means of bolts, with a kind of cylinder head 41 which closes jacket 6 and is provided with a housing 42 for a spring 15.

Control of the movement of piston 23 and slide valve 34 by differential piston 24, 25 is performed in a manner slightly different from that shown by FIG. 1, but in this case also in combination with check valve 37 and needle valve 56, for the obtainment of the same result. In this construction, piston 23 is controlled by the differential portion 25 of differential piston 24, 25, and slide valve 34 by portion 24, for the sake of simplification.

The whole of the self regulating control device is contained in frame 43 which may be distinct from the frame of the engine proper.

The operation of a steam engine according to the invention is clearly illustrated by FIG. 2.

The steam introduced from chamber 7 in the upper dead center position of the piston, the valve being opened through the above described control device, enters the cylinder until the valve is closed, that is to say until the piston has reached point B. Expansion then takes place along curve BC until the piston has begun to clear (point C) ports 4, the pressure being then for instance of 4 kg./cm.² to decrease subsequently as far as the point D corresponding to the lower dead center position.

When the piston reverses its stroke, it produces a compression after the closing of ports 4 (point E), as far as point A' for which the pressure reaches the value of the admission pressure, the valve then opening.

Such a cycle has a high efficiency and corresponds to an excellent lubrication due to the presence of the steam chamber which prevents condensation upon the walls of cylinder 1 of water droplets as might take place at the end of the expansion stroke.

In addition to these advantages, due to the relatively high efficiency and the easy lubrication of the engine, the invention further permits of making steam engines which are simple, cheap and easy to adjust.

Fluidtightness of the valve is ensured in the best possible conditions without producing substantial leaks.

The invention may be applied to many different fields. In particular it may be advantageous to feed such engines with steam obtained from the residual heat contained in the exhaust gases of gas turbines. The temperature of these gases generally averages 600° C. so that it is perfectly possible to extract therefrom, in the best possible conditions, the heat intended to produce steam at 300° C. or 350° C. and under the high pressure above referred to.

But of course all other applications remain possible, even if they make use of boilers fed with all kinds of fuels.

In a general manner, while I have in the above description disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A steam engine which comprises, in combination,
    a cylinder including a cylinder head rigid therewith, said cylinder being provided with an exhaust port, said cylinder head being provided with an inlet port,
    a piston reciprocable in said cylinder,
    a steam feed jacket distinct from both said cylinder and said cylinder head surrounding said cylinder head and the portion of said cylinder adjoining said cylinder head so as to form a steam chamber opening into said cylinder through said inlet port, the base of said steam jacket being located at a level between that of said cylinder head and that of said exhaust port, at a short distance above said exhaust port,
    an annular plate rigid with the base of said steam jacket and extending between it and the external wall of said cylinder to close said steam jacket and
    means for rigidly securing said annular plate to said cylinder, said rigid means forming the only mechanical connection between said steam jacket on the one hand and the whole of the cylinder head on the other hand.

2. A steam engine according to claim 1 wherein said cylinder is provided with a shoulder against which said annular plate is applied, said means comprising:
    a flange for securing said cylinder head to said cylinder, and
    tightening bolts connecting said annular plate with said flange.

3. A steam engine according to claim 1 which comprises:
    an inlet valve carried by said cylinder head and adapted to cooperate with said inlet port on the outer face of said cylinder head for controlling the communication between the inside of said cylinder and the inside of said steam jacket,
    said engine being of the two stroke type and such that the waste space in the outer dead center position of the piston, at the end of the compression stroke, gives rise to a pressure in said cylinder at least equal to the intake pressure, so as to facilitate the opening of said valve,
    and a rod of small cross section for actuating said inlet valve, said rod extending through the wall of said steam jacket, with respect to which it is movable.

4. A steam engine according to claim 1 which further comprises:
    an inlet valve carried by said cylinder head and adapted to cooperate with said inlet port on the outer face of said cylinder head for controlling the communication between the inside of said cylinder and the inside of said steam jacket,
    means for actuating said inlet valve, said means being located on the outside of said steam jacket,
    a rod for transmitting the action of said last mentioned means to said inlet valve, said rod extending through the wall of said jacket with respect to which it is movable,
    and a packing check valve carried by said rod and located on the inside of said jacket.

5. A steam engine which comprises, in combination:
    a cylinder including a cylinder head rigid therewith, said cylinder being provided with an exhaust port, said cylinder head being provided with an inlet port,
    an engine piston reciprocable in said cylinder,
    a steam feed jacket surrounding said cylinder head and the portion of said cylinder adjoining said cylinder head,
    means for rigidly securing said steam jacket with said cylinder,
    an inlet valve carried by said cylinder head and adapted to cooperate with said inlet port on the outer face of said cylinder head for controlling the communication between the inside of said cylinder and the inside of said steam jacket,
    a rod extending in a fluidtight manner through the wall of said steam jacket with respect to which it is movable,
    a casing including a first cylindrical bore filled with a liquid and in line with said rod,
    a first pump piston slidable in said first cylindrical bore adapted to cooperate with said rod,
    said casing being provided with a second cylindrical bore in permanent communication with said first cylindrical bore,
    a second pump piston slidable in said second cylindrical bore,
    said casing being provided with a third cylindrical bore in line with said second cylindrical bore and of larger diameter than it,
    a third pump piston slidable in said third cylindrical bore and rigid with said second pump piston,
    said casing forming a liquid reserve tank communicating with said second cylindrical bore through a passage adapted to be closed by said second piston near the end of every stroke thereof toward said first cylindrical bore,
    means operatively connected with said engine piston for reciprocating said second and third pump pistons for every stroke of said engine piston,
    the space of said third cylindrical bore wherein said second pump piston is movable being in communication with said liquid reserve tank through a passage adapted to be closed by said third piston at the end of every stroke thereof toward said first cylindrical bore,
    said casing being provided with two passages in shunt with each other and both opening into said casing first cylindrical bore through a fourth cylindrical bore,
a check valve in one of said shunt passages opening under the thrust of liquid from said space,
the other shunt passage including a throttled portion, and
a shuttle in said fourth cylindrical bore,
said fourth cylindrical bore being provided with two liquid ports adapted to cooperate with said shuttle to control the rate of feed of liquid by said second pump piston.

References Cited

UNITED STATES PATENTS

| | | | |
|---|---|---|---|
| 731,265 | 4/1902 | Austin | 92—171 |
| 1,213,340 | 1/1917 | Davis | 92—171 |
| 1,488,272 | 3/1924 | Milner | 92—171 |
| 2,088,582 | 8/1937 | Bishop | 91—188 |
| 2,113,936 | 4/1938 | Fickett et al. | 91—188 |

MARTIN P. SCHWADRON *Primary Examiner.*

PAUL E. MASLOUSKY, *Examiner.*